R. GREER & W. J. THOMASON.
Dumping-Wagons.

No. 143,570. Patented Oct. 14, 1873.

Witnesses.
A. H. Norris
William J. Peyton

Inventors:
Robert Greer and W. J. Thomason
Per James L. Norris.
Atty.

UNITED STATES PATENT OFFICE.

ROBERT GREER AND WILLIAM J. THOMASON, OF RALEIGH, N. C.

IMPROVEMENT IN DUMPING-WAGONS.

Specification forming part of Letters Patent No. 143,570, dated October 14, 1873; application filed August 21, 1873.

*To all whom it may concern:*

Be it known that we, ROBERT GREER and WILLIAM J. THOMASON, of Raleigh, in the county of Wake and State of North Carolina, have invented certain new and useful Improvements in Dumping-Carts, of which the following is a specification:

This invention consists in the arrangement of thills extending under the box of the cart between the sills thereof, and connected to said sills by a pivot or pivots in front of and above the axle, in combination with a spring-catch and with a lever, which is attached to a cross-bar connecting the thills, in such a manner that the driver standing in front of the cart can readily operate the releasing-lever, and by the position of the pivots of the thills in front and above the axle a certain leverage is obtained, enabling the draft animal, by backing up, to dump the contents of the cart, even if the greatest portion of the load should be in front of the axle.

Figure 1:
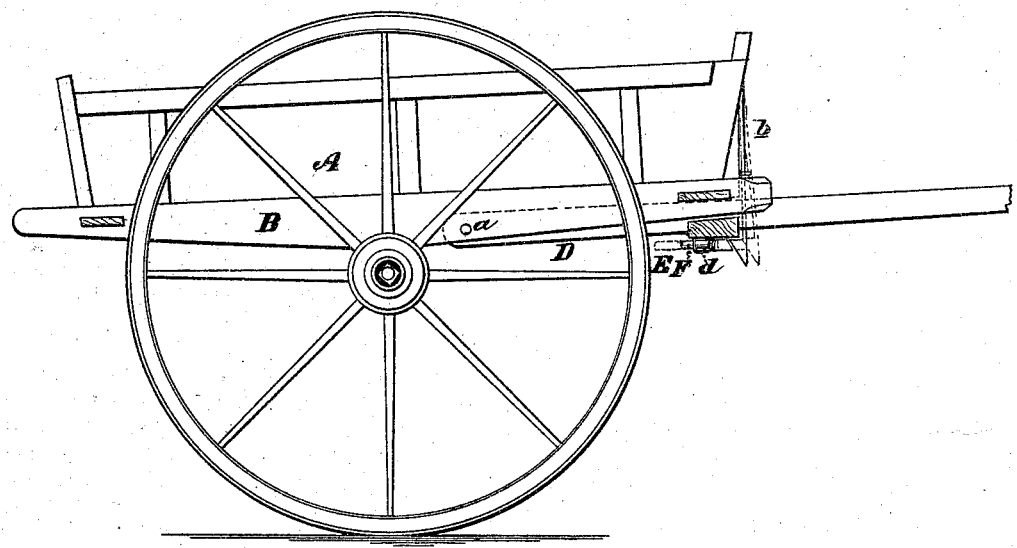
Figure 2:
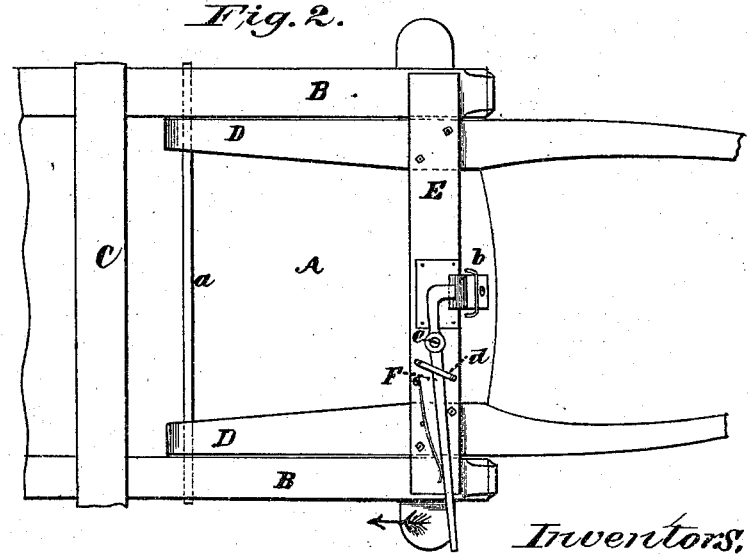

In the drawings, Figure 1 is a longitudinal vertical section of this invention. Fig. 2 is an inverted plan of the same.

In the drawing, the letter A designates the box of my cart, which is supported by sills B resting on and firmly secured to the axle C. D D are the thills, which extend between the sills B, and are secured to the same by a rod or pivot, $a$, which has its bearings in the sills above and in front of the axle. Said thills are connected by a cross-bar, E, and to the front end of the box A is secured a spring-catch, $b$, which, when the thills are swung up or when the front end of the box is depressed, will catch over the edge of said cross-bar, and thereby the box is prevented from turning down behind. On the cross-bar E is secured a releasing-lever, F, which has its fulcrum on a pivot, $c$, and is guided in a staple, $d$. (See Fig. 2.) By pressing this lever back in the direction of the arrow the spring-catch is caused to release the cross-bar E, and the contents of the cart can be dumped. By connecting the thills to the sills of the box above and in front of the axle a certain leverage is obtained, so that the draft animal, by backing up, is enabled to dump the contents of the cart, even if the greatest portion of the load should be in front of the axle.

We claim as our invention—

The thills D, connected to the sills B of the box A above and in front of the axle, in combination with the cross-bar E, spring-catch $b$, and releasing-lever F, all constructed to operate substantially as shown and described.

In testimony that we claim the foregoing we have hereunto set our hands this 16th day of July, 1873.

ROBERT GREER.
W. J. THOMASON.

Witnesses:
J. H. HARRIS,
A. HILT.